(12) United States Patent
Zalanka et al.

(10) Patent No.: US 12,214,824 B2
(45) Date of Patent: Feb. 4, 2025

(54) FRONT RAIL WELDMENT

(71) Applicant: Caterpillar Inc., Peoria, IL (US)

(72) Inventors: David O. Zalanka, Mt. Zion, IL (US); Timothy D. Harman, Forsyth, IL (US)

(73) Assignee: Caterpillar Inc., Peoria, IL (US)

( * ) Notice: Subject to any disclaimer, the term of this patent is extended or adjusted under 35 U.S.C. 154(b) by 245 days.

(21) Appl. No.: 17/944,483

(22) Filed: Sep. 14, 2022

(65) Prior Publication Data

US 2024/0083506 A1 Mar. 14, 2024

(51) Int. Cl.
*B62D 21/11* (2006.01)
*B62D 65/12* (2006.01)

(52) U.S. Cl.
CPC .............. *B62D 21/11* (2013.01); *B62D 65/12* (2013.01)

(58) Field of Classification Search
CPC ....... B62D 21/11; B62D 65/12; B62D 21/186
See application file for complete search history.

(56) References Cited

U.S. PATENT DOCUMENTS

| | | |
|---|---|---|
| 3,977,489 A | 8/1976 | Cole et al. |
| 4,263,980 A | 4/1981 | Harlow, Jr. et al. |
| 6,926,350 B2 | 8/2005 | Gabbianelli et al. |
| 10,676,133 B2 | 6/2020 | Komiya et al. |
| 11,021,193 B2 | 6/2021 | Kitamura et al. |
| 11,235,808 B2 | 2/2022 | Miller et al. |
| 2004/0238659 A1 | 12/2004 | Wubben et al. |
| 2019/0217894 A1 | 7/2019 | Upah et al. |
| 2021/0122211 A1 | 4/2021 | Miller |
| 2021/0155172 A1* | 5/2021 | Maeda .................. B60K 11/04 |
| 2022/0033003 A1 | 2/2022 | Kim et al. |

FOREIGN PATENT DOCUMENTS

| | | |
|---|---|---|
| CN | 215794034 | 2/2022 |
| JP | 4710536 | 6/2011 |
| WO | 2021080942 A1 | 4/2021 |

OTHER PUBLICATIONS

Written Opinion and International Search Report for Int'l. Patent Appln. No. PCT/US2023/072539, mailed Dec. 8, 2022 (11 pgs).

* cited by examiner

*Primary Examiner* — Rick K Chang (57) ABSTRACT

A front rail weldment may include a base frame comprising a pair of substantially uninterrupted outlooking members extending from a first end to a second end and a cross member extending therebetween. The weldment may also include a pair of hangar bars each secured to respective outlooking members of the base frame at or near a midpoint of the respective outlooking members and extending upward to a top end. The weldment may also include a pair of struts extending from a respective first end of the pair of outlooking members to the top of a respective hangar bar of the pair of hangar bars. The weldment may also include a pair of tieback bars each configured for tying back the top end of a respective hangar bar of the pair of hangar bars.

19 Claims, 9 Drawing Sheets

FRONT RAIL WELDMENT

TECHNOLOGICAL FIELD

The present application relates generally to support systems for vehicles and, in particular, work machines such as trucks, haul trucks, and articulated trucks. More particularly, the present application relates to support frames for supporting a body, truck bed, cab, platform, and other structures relative to a suspension system on a work machine. Still more particularly, the present application relates to particular aspects of the support frame including front portions of the support frame that may interact with a front suspension and/or support frontal aspects of the work machine.

BACKGROUND

Vehicle and/or work machine frames can be intricate structures with multiple parts and pieces arranged at a variety of angles relative to one another to accommodate loading points from the work machine body, truck bed, bumper rails, cabs, hydraulic cylinders, suspension components including shocks or struts, A-bars, and other features. Loading on vehicle or work machine frames can be unpredictable and difficult to assess resulting in inefficient designs that include excessively thick or oversized plates, tubes, bars, or other structures. These excessively thick or oversized structures can create a need for correspondingly oversized welds, which can generate a lot of heat during the manufacturing process resulting in warpage of the component, weldment, or frame.

US Patent Application No. 2021/0122211 relates to a space frame front lower suspension connection. A front lower suspension connection for a space frame comprises a U-shaped base and upper suspension control arm support sections on the U-shaped base. The U-shaped base can have a cross-beam section and suspension column support beam sections positioned at opposite ends of the cross-beam section. Each upper suspension control arm support section can have a first support column and a second support column spaced from the first support column. Generally, the prime mover may be provided in a space 21 of the space frame 20 at a front 26 of the space frame 20. The front mounting surfaces 2940 can be adapted to have fixedly attached (e.g., weldably attached) thereto one or more elongate support members. For instance, FIGS. 4-8 show front mounting surfaces 2940 being adapted to have six elongate support members, four elongate support members 203 and two elongate support members 202, extending therefrom. Elongate support members 203 may extend horizontally or substantially horizontally (e.g., 1-2 degrees from horizontal). Elongate support members 202 may extend at an angle, for instance, an acute angle relative to horizontal.

SUMMARY

In one or more examples, a front rail weldment may include a base frame comprising a pair of substantially uninterrupted outlooking members extending from a first end to a second end and a cross member extending therebetween. The weldment may also include a pair of hangar bars each secured to respective outlooking members of the base frame at or near a midpoint of the respective outlooking members and extending upward to a top end. The weldment may also include a pair of struts extending from a respective first end of the pair of outlooking members to the top of a respective hangar bar of the pair of hangar bars. The weldment may also include a pair of tieback bars each configured for tying back the top end of a respective hangar bar of the pair of hangar bars.

In one or more examples, a work machine may include a frame, a prime mover arranged on the frame, and a wheel and tire assembly operably coupled to the prime mover and coupled to the frame with a suspension. The frame of the work machine may include a base frame comprising a pair of substantially uninterrupted outlooking members extending from a first end to a second end and a cross member extending therebetween. The frame may also include a pair of hangar bars each secured to respective outlooking members of the base frame at or near a midpoint of the respective outlooking members and extending upward to a top end. The frame may also include a pair of struts extending from a respective first end of the pair of outlooking members to the top of a respective hangar bar of the pair of hangar bars. The frame may also include a pair of tieback bars each configured for tying back the top end of a respective hangar bar of the pair of hangar bars.

DESCRIPTION OF THE DRAWINGS

FIG. 3 is a frontal perspective view of a cross member of the front rail weldment, according to one or more examples.

DETAILED DESCRIPTION

Figure 1:
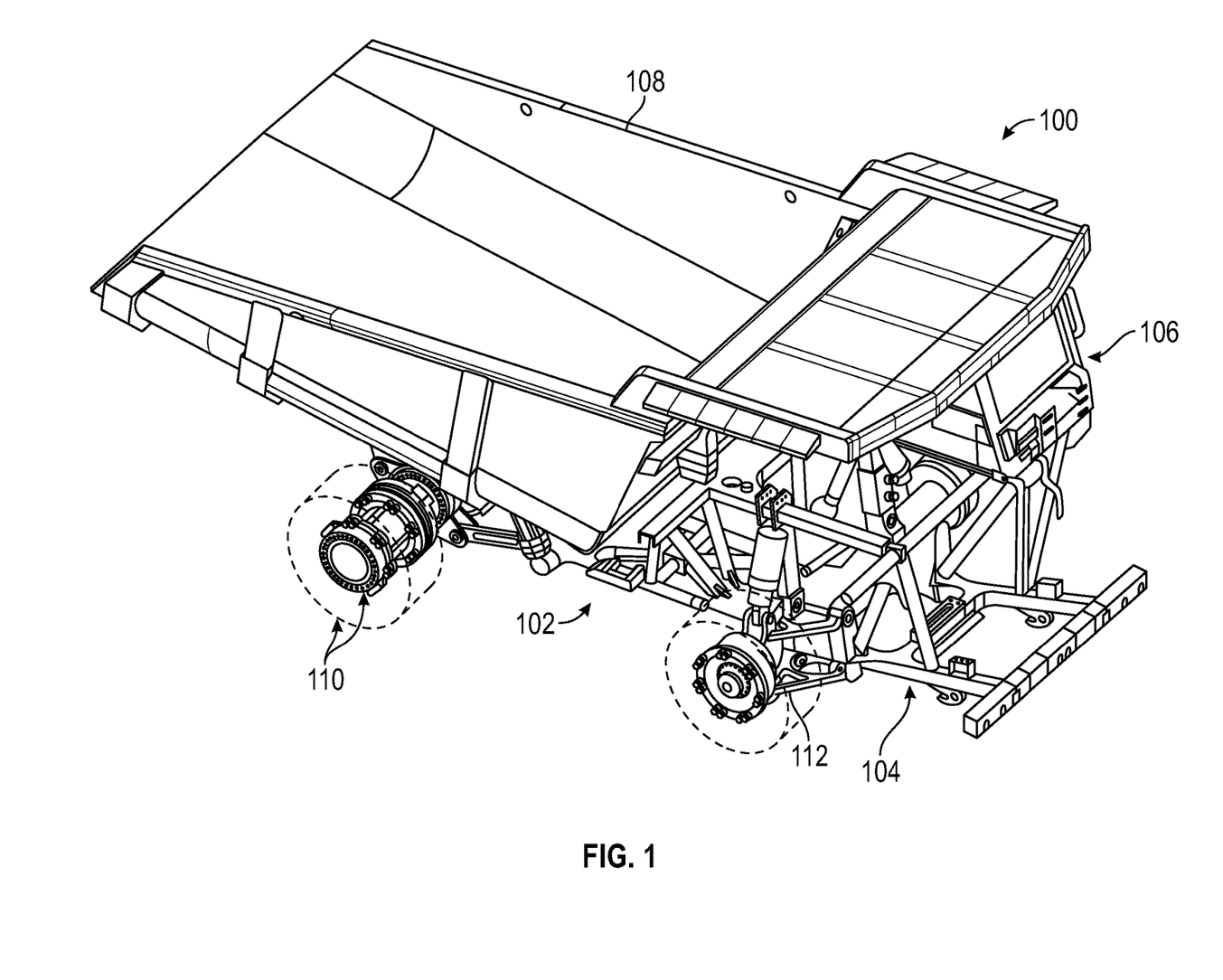
FIG. 1 is a perspective view of a work machine having a support frame with a front rail weldment, according to one or more examples.

FIG. 1 is a front perspective view of a work machine 100 having a support frame 102 with a front rail weldment 104, according to one or more examples. The work machine 100 may include haul truck, for example, or another type of work machine may be provided. The work machine 100 may include a prime mover arranged on the support frame 102 in addition to a cab or operator station 106 and a dump body or truck bed 108. The dump body or truck bed 108 may be operably coupled to the support frame 102 such as by a pivot connection and an actuator for pivoting the dump body 108 about the pivot connection to dump material out of the dump body 108. The work machine 100 may also include a ground engaging traction system such as one or more wheel and tire assemblies 110 (tires shown in phantom line to provide for frame viewing). The wheel and tire assemblies 110 may be operably coupled to the support frame 102 via a suspension 112. The prime mover may be operably coupled to the one or more wheel and tire assemblies 110 such as by way of a transmission, drive train, drive axle, and/or other components, for example.

Figure 2:
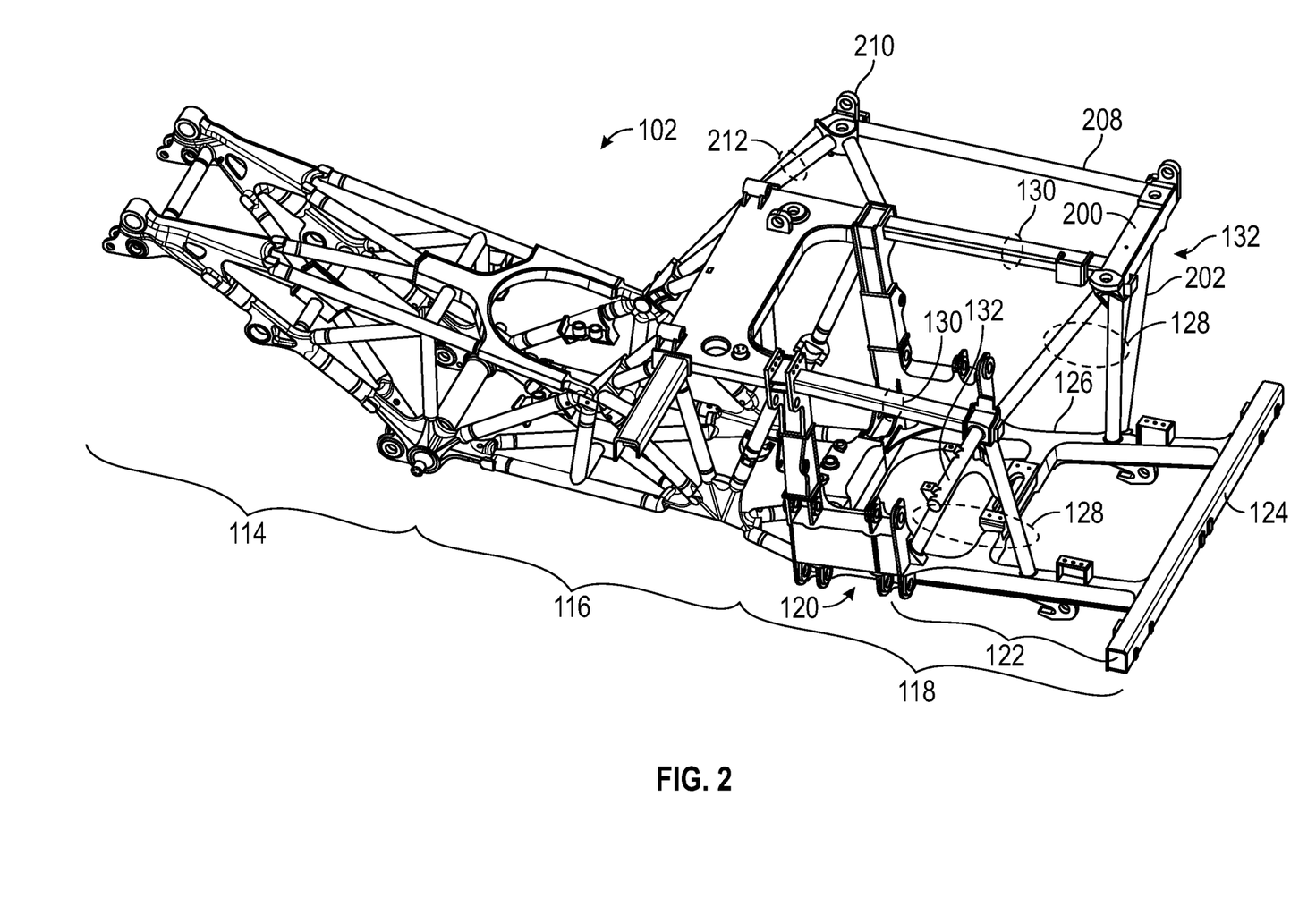
FIG. 2 is a perspective view of the support frame in isolation from the work machine of FIG. 1, according to one or more examples.

Turning now to FIG. 2, the support frame 102 is shown. The support frame 102 may be configured to support the work machine 100 and all components thereof relative to a suspension system 112 coupling the support frame 102 to the wheel and tire assemblies 110. As shown, the support frame 102 may include a rear portion 114 for pivotally coupling and supporting the dump body 108 as well as coupling of a rear suspension system for rear wheel and tire assemblies 110. The frame 102 may also include a central portion 116 for bridging between front and rear wheel and tire assemblies 110 and supporting the loads from the dump body 108. The frame 102 may also include a front portion 118 for coupling of a front suspension system 112 for the front wheel and tire assemblies 110 as well as for supporting the prime mover, cab, and other frontal aspects of the work machine 100. As shown, and with particular regard to the front wheel and tire assemblies 110 and front suspension 112, a suspension connection weldment 120 may be provided in the front portion 118 of the space frame 102. Still further, a front rail weldment 122 may be arranged on a front side of the suspension connection weldment 120.

The front rail weldment 122 may extend from the suspension connection weldment 120 and may be configured to support a prime mover, a front rail 124, and other frontal aspects of the work machine 100 such as the cab or operator station 106, access stairs, and other features of the particular work machine 100. As shown in FIG. 2, the front rail weldment 122 may include a base frame 126 extending forward to the front rail 124, a pair of upright supports 128, a pair of tieback bars 130, and one or more laterally extending support systems 132.

Figure 3:
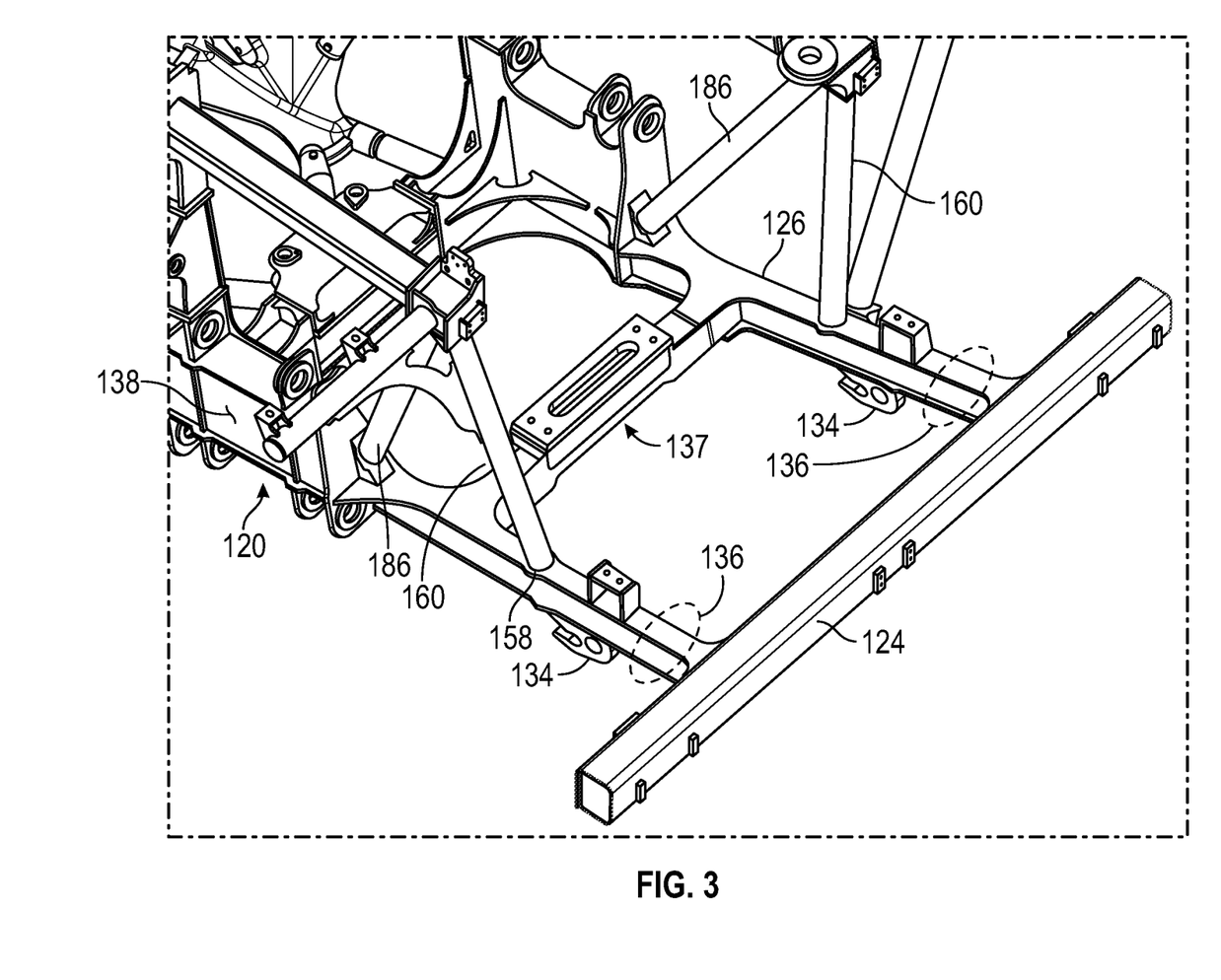
FIG. 3 is perspective view of the front rail weldment of the support frame of FIGS. 1 and 2, according to one or more examples.

The base frame 126 is shown in FIG. 3. The base frame may be configured to extend forward from the suspension connection weldment 120 and form a bottom portion of the front rail weldment 122. The base frame 126 may, for example, be configured for setting the prime mover thereon, for attaching the front rail 124 thereto, and may also include tow lugs 134 on a bottom side thereof. As such, loads from front aspects of the work machine 100 may be imparted directly on the base frame 126. In one or more examples, the base frame 126 may include a pair of outlooking members 136 and a cross member 137.

Figure 4:
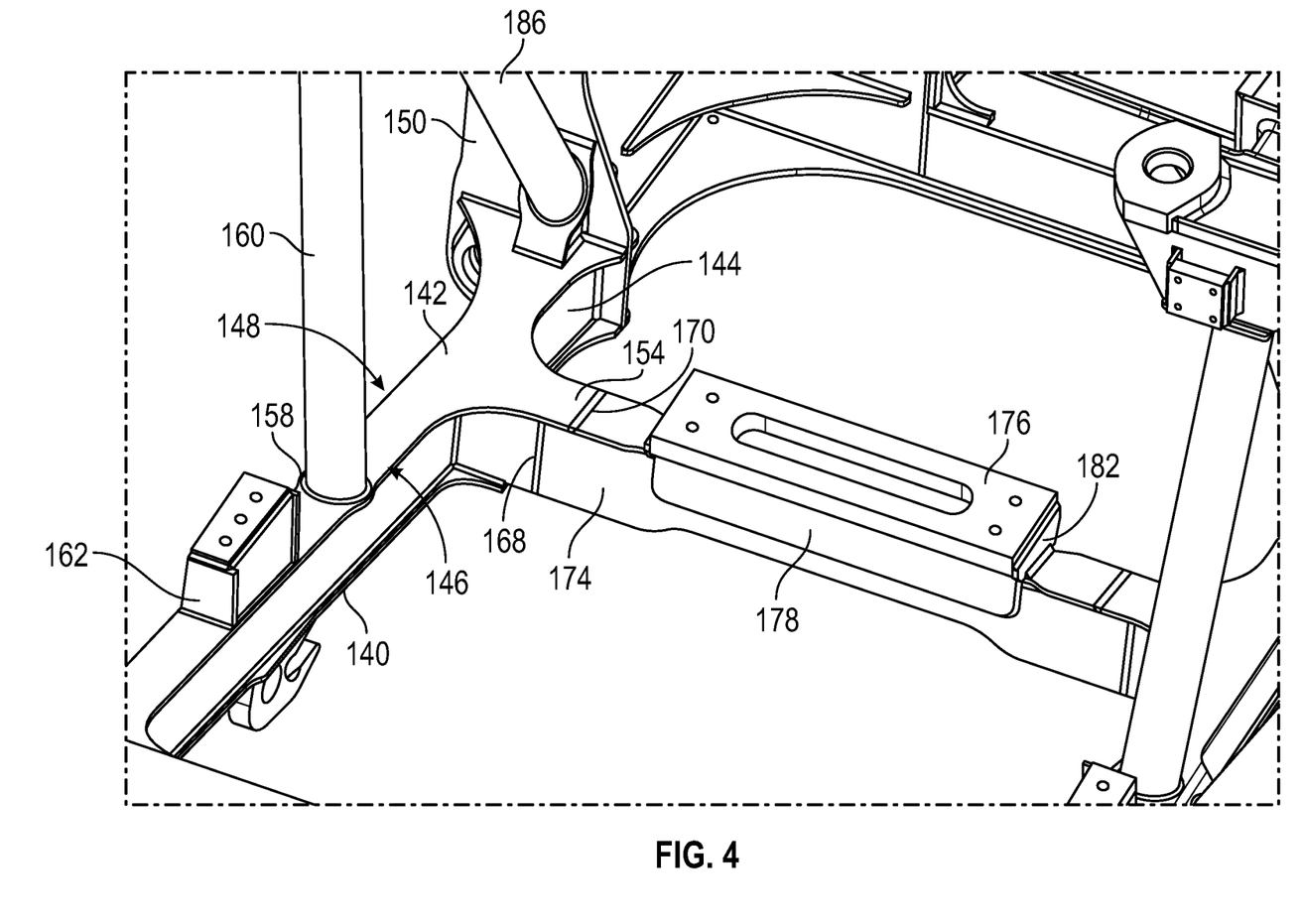

The outlooking members 136 may define the lateral sides and bottom of the base frame 126 and may be configured for supporting one or more portions of the prime mover, for connection to and support of the front rail 124, and for connection of one or more tow lugs 134. The outlooking members 136 may extend generally longitudinally relative to the work machine 100 and from a front bottom portion of a flank wall 138 of the suspension connection weldment 120. In one or more examples, the outlooking members 136 may have a generally rectangular cross section and may be built up from one or more plates. For example, the outlooking members may each include a bottom plate 140, a top plate 142, and two side plates 144. In one or more examples, the two side plates 144 may extend from a top side surface of the bottom plate 140 to a bottom side surface of the top plate 142 where the top plate 142 and the bottom plate 140 extend laterally slightly further than an outside surface of the two side plates 144. As shown in FIG. 4, for example, the outlooking members 136 may be substantially uninterrupted between the connection to the suspension connection weldment 120 and the back side of the rail 124. That is, in one or more examples, the side plates 144 of the outlooking members 136 may be substantially continuous and uninterrupted along the length. In one or more other examples, the top and bottom plates 140/142 may additionally or alternatively be substantially uninterrupted. In one or more examples, uninterrupted may mean there are no joints, bores, seams other interruptions of the plate material. In other examples, uninterrupted may mean there are no deviations of alignment from one plate to an adjacent plate, but seams may be provided.

Figure 7:
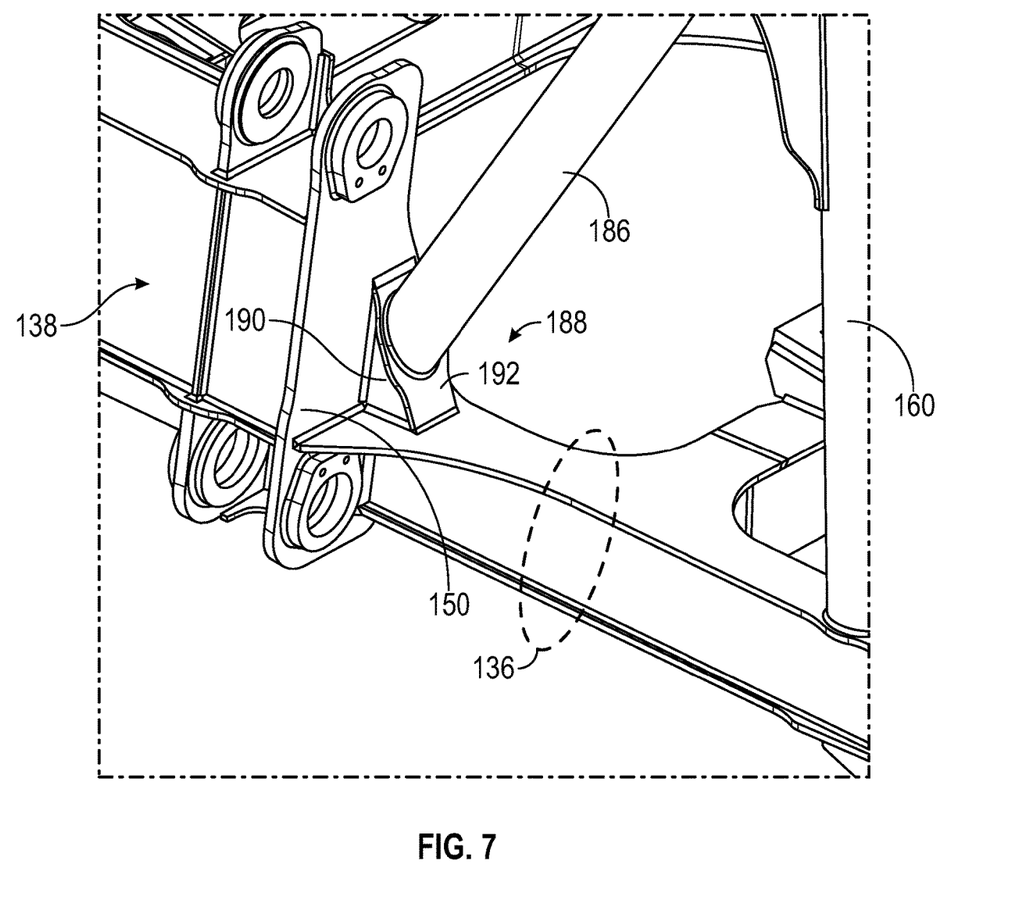
FIG. 7 is a close-up perspective view of an attachment of the front rail weldment to a suspension connection weldment and showing a buttressed connection for a strut, according to one or more examples.
Figure 8:
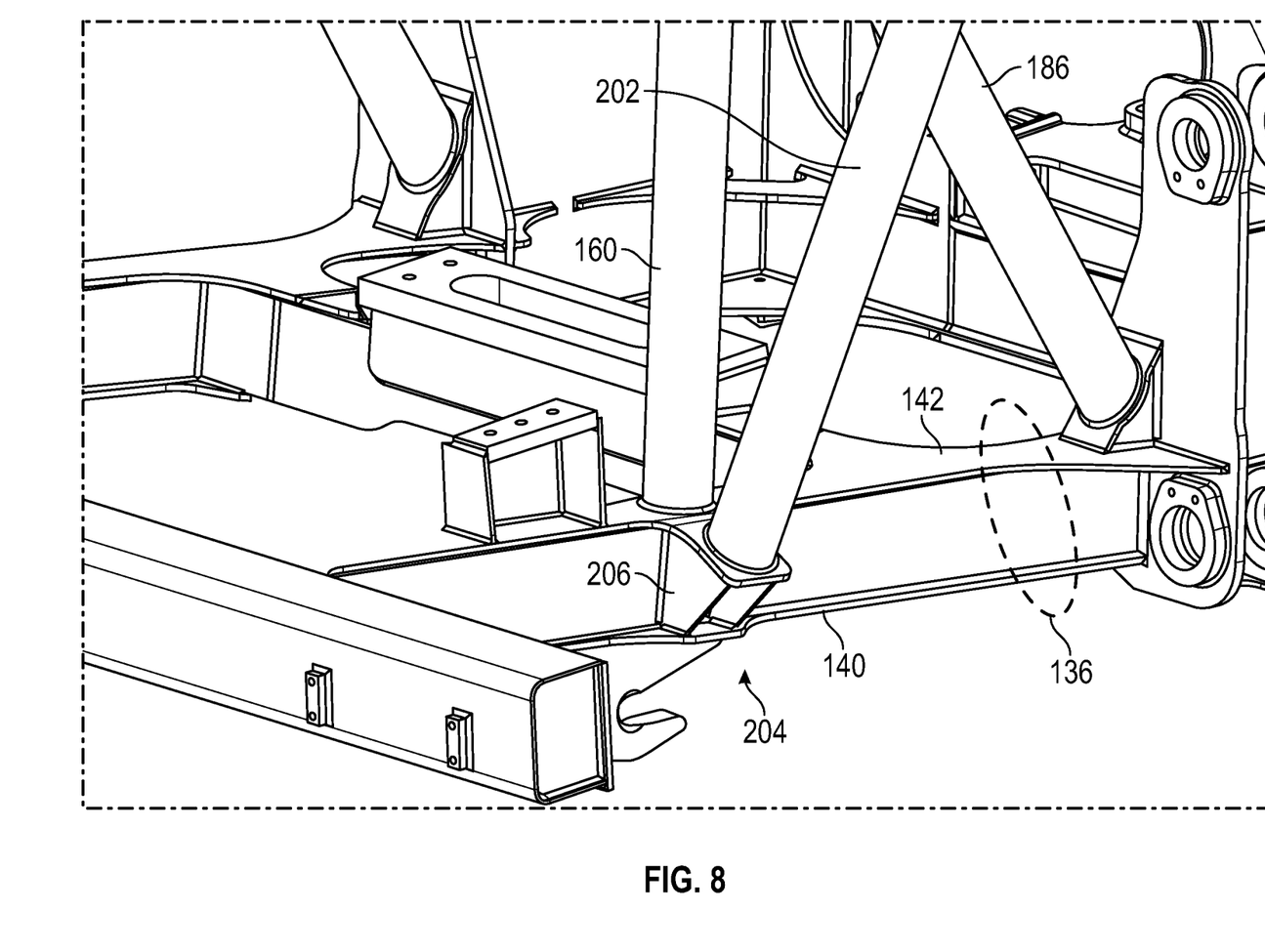
FIG. 8 is a close-up perspective view of a muti-tube connection, according to one or more examples.
Figure 9:
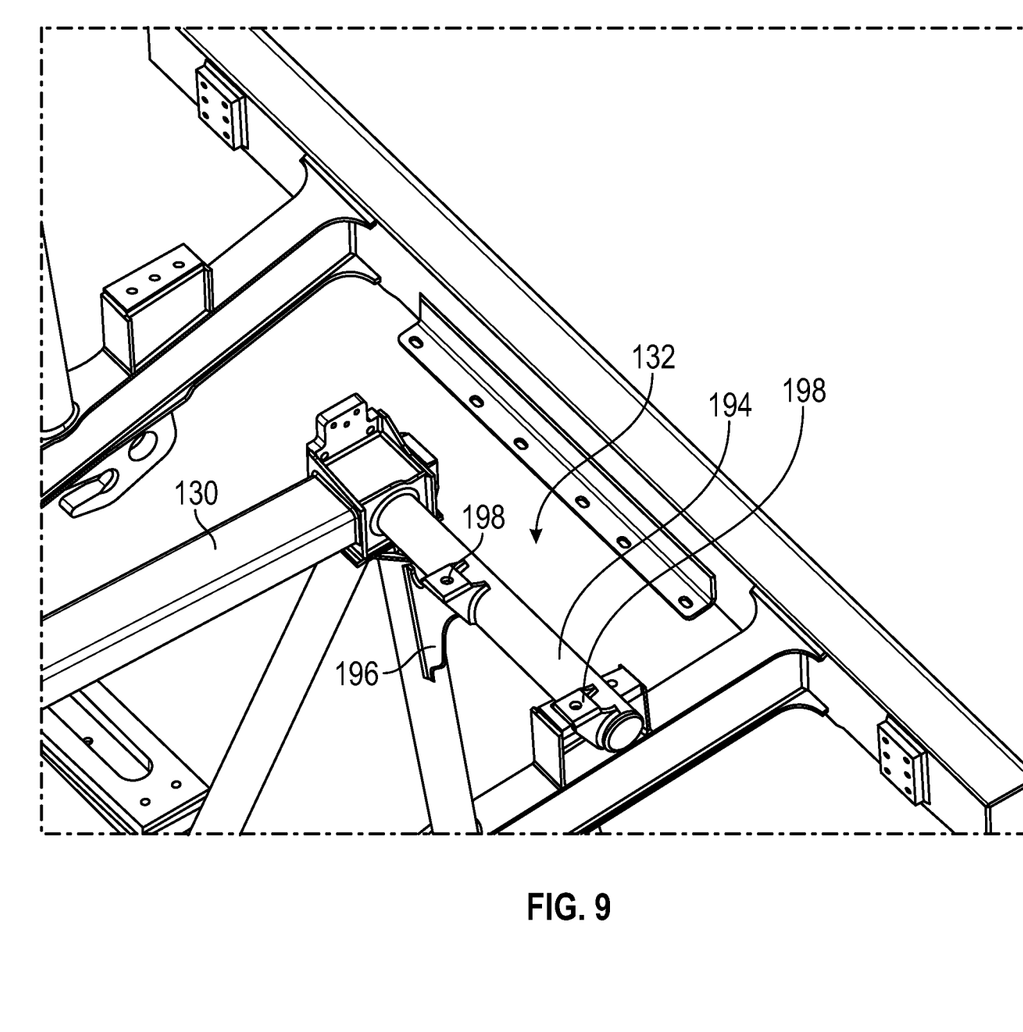
FIG. 9 is a rear and upper perspective view of a laterally extending perch of the front rail weldment, according to one or more examples.

In some locations, the inboard or outboard edge 146/148 of the top and/or bottom plate 140/142 may be profiled to smoothly transition to adjoining elements or control stress concentrations at weld connections or ends. For example, where the top plate 142 adjoins the front plate 150 of the flank wall 138, the inboard and outboard edges 146/148 of the top plate 142 may be flared inward and outward, respectively. A similar inward flare may be provided at the bottom plate 140. As shown in FIGS. 7 and 8, an outboard flare of the bottom plate 140 may be omitted to avoid interfering with a connection bore on the front side of the flank wall 138. Similar inward and outward flares of both the top and bottom plate 142/140 may be provided where the outlooking member 136 adjoins or is secured to the front rail 124 as shown in FIG. 9. Similarly, where the top plate 142 adjoins a top plate 154 of the cross member 137, a curved or radiused transition may be provided between a longitudinally extending edge and a laterally extending edge. As shown in the underside view of FIG. 5, where the bottom plate 140 adjoins the cross member 137, inwardly extending tabs 152 may be provided to align with laterally extending side walls 156 of the cross member 137. Radiused or curved transitions between the longitudinally extending edge of the bottom plate 140 may be provided to transition to the tabs 152.

A support point 158 for the outlooking members 136 may be provided about half way along the outlooking members 136 between the connection to the flank walls 138 of the suspension connection weldment 120 and the attachment to the front rail 124. That is, a vertically extending hangar 160 may be secured to the outlooking members 136 at the support point 158. A mount bracket 162 may also be provided slightly forward of the support point 158. The mount bracket 162 may include a forward and rear plate, an inboard plate, and a cover plate with holes adapted to receive fasteners from the mounted device or item. On a bottom side of the outlooking members 136, tow lugs 134 may be provided. As shown, the tow lugs 134 may be secured to a bottom side surface of the bottom plate 140 of the outlooking members 136. The tow lugs 134 may include a substantially thick plate arranged on edge relative to the bottom plate 140 and extending downward therefrom. The tow lugs 134 may be machined to include a bore extending therethrough and a hook on a rear side thereof. In one or more examples, as shown in FIG. 8, the hook may include an upper angled or chamfered surface leading forward and downward to a U-shaped slot so as to assist in avoiding hang up of ropes or cables above the slot. Still other hook profiles may be provided.

Figure 5:
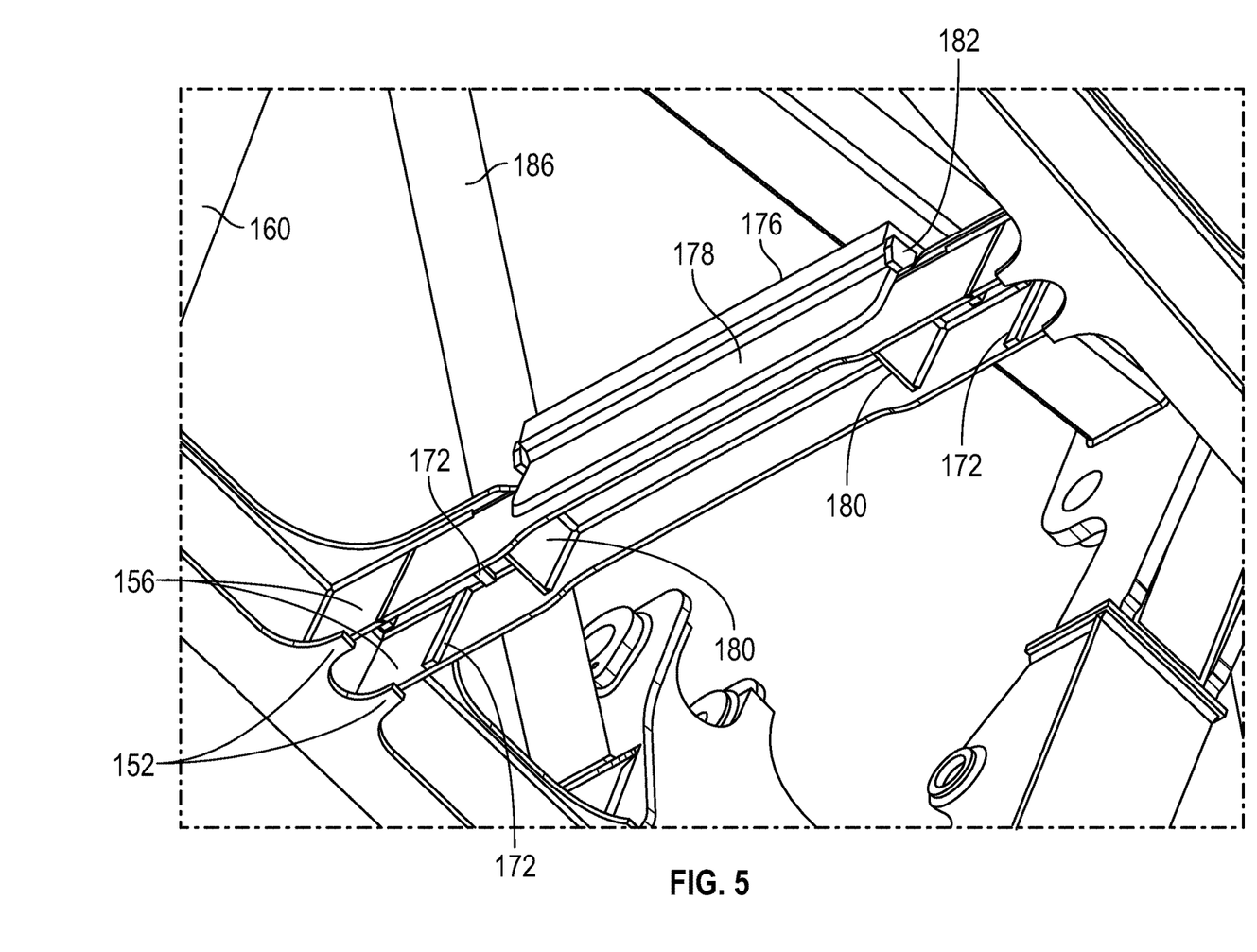
FIG. 5 is an underside perspective view of the cross member of FIG. 6.
Figure 6:
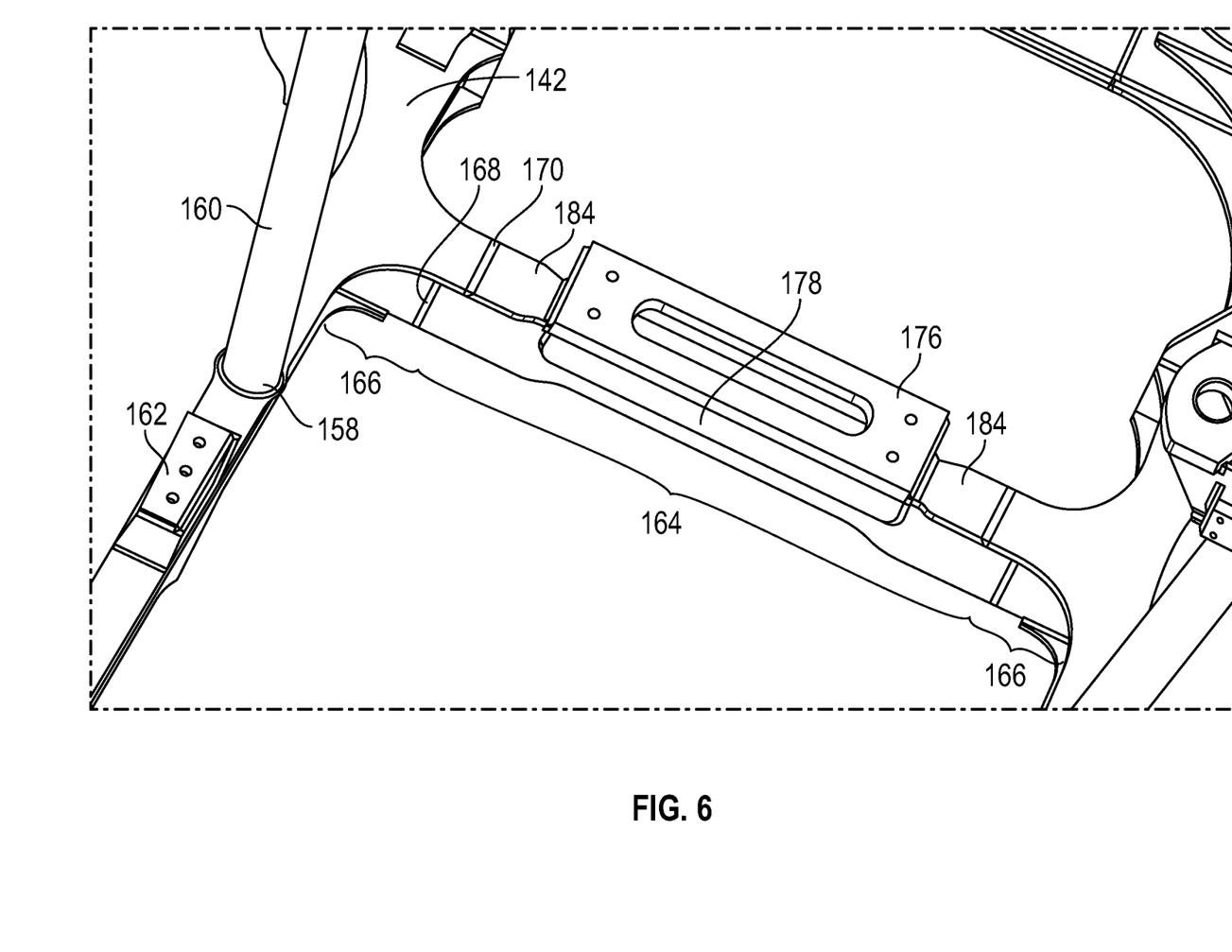
FIG. 6 is a top side perspective view of the cross member of FIG. 6.

The cross member 137 may extend laterally between the pair of outlooking members 136 of the base frame 126 and may be configured as the main support member for the prime mover. As shown, the cross member 137 may generally include a top plate, a pair of spaced apart side plates, and an open bottom. In one or more examples, as shown in FIG. 6, the cross member 137 may include a central portion 164 and two outboard portions 166 that allow for modular construction of the cross member 137 or base frame 126 and machining of the several parts. As shown in FIGS. 4-6, for example, the outboard portions 166 may include a pair of spaced apart side plates 156 on an underside of a laterally extending portion of the top plate 142 of the outlooking members. The side plates 156 may be secured to an inboard side of the outlooking member 136 and may extend inboard away from the outlooking member 136 to a wall splice 168. The portion of the top plate 142 of the outlooking member 136 extending laterally inward may form a portion of the outboard portion 166 of the cross member 137 and may extend laterally inward to a top plate splice 170 that is offset from the wall splice. In this case, the top plate splice may be arranged further inward than the wall splice 168. As shown in FIG. 5, backer bars 172 may be provided inside the cross member 137 at the wall splice 168 and at the top plate splice 170. The tabs 152 shown in FIG. 5 extending laterally inward from the bottom plate 140 of the outlooking members 136 may also form a portion of the outboard portion 166 of the cross member 137.

The central portion 164 of the cross member 137 may include a pair of spaced apart side plates 174 extending from the wall splice 168 on one end to another wall splice 168 on the other opposing end. The top of the central portion 164 may include a series of plates or members configured for establishing a mount for the prime mover. For example, a substantially thick mount plate 176 may be provided. The mount plate 176 may have a width extending beyond the side plates 174 and a length extending over a substantial length of the central portion 164. The mount plate 176 may include one or more bores or threaded bores for receiving fasteners to secure the prime mover. The bores may be arranged on each end of the mount plate 176. In addition, an access opening may be provided in the form of an elongate opening having a width of about a middle third of the width of the mount plate and extending along the length of the mount plate between the bores arranged each end. A pair of flank plates 178 may be provided extending downward from the mount plate 176 and spaced apart from one another by a distance to receive the side plates 174 therebetween. That is, as shown in FIGS. 4-6, the flank plates 178 may be arranged immediately outside of the side plates 174 and may be welded or otherwise secured thereto. The flank plates 178 may function to raise the mount plate 176 above a top edge of the side plates 174 or the mount plate 176 may rest on a top edge of the side plates 174. As shown in FIG. 5, at each end of the mount plate 176, on an under side thereof, a stiffener 180 may be provided. The stiffener 180 may be arranged to extend longitudinally along the work machine 100 (e.g., laterally across the cross member 137) between the side plates 174 of the central portion 164 of the cross member 137. In addition, end plates 182 may be provided that are arranged on each end of the mount plate 176. The end plates 182 may extend across the end of the mount plate 176 and beyond the side plates 174 and flank plates 178. The remaining portion of the central portion 164 (e.g., beyond the ends of the mount plate 176) may include substantially thinner or lighter top plates 184 on each end thereof. As shown, the lighter top plates 184 may extend from the top plate splice 170 inward to the end plates 182 or the mount plate 176. As the lighter top plates 184 approach the mount plate 176, the edges may be curved or tapered inward to match the width or spacing of the flank plates 178.

Turning now to the upright supports 128, reference is again made to FIG. 2. The upright supports 128 may be configured to function with the tieback bars 130 to provide vertical support to the outlooking members 136 of the base frame 126. As shown in FIG. 3, the upright supports 128 may include a diagonally extending strut 186 and the previously mentioned hangar bar 160. An upright support 128 including a strut 186 and hangar bar 160 may be provided on each side of the base frame 126. The diagonally extending strut 186 may extend from the connection of the base frame 126 to the suspension connection weldment 120 diagonally forward, upward, and slightly outward to a free end of the tieback bar 130. In one or more examples, the strut 186 may be a generally round tube or a rectangular tube or other cross section may be provided.

As shown in detail in FIG. 7, the bottom end of the diagonally extending strut 186 may frame into a buttress connection 188 between the top plate 142 of the outlooking member 136 of the base frame 126 and a front plate 150 of the suspension connecting weldment 120. The buttress connection 188 may include one or two generally triangular buttress plates 190 and a cover plate 192 arranged along the hypotenuse of the triangular buttress plates 190. The diagonally extending strut 186 may be welded or secured to the surface of the cover plate 192. In one or more examples, the cover plate 192 may include side edges extending along the length of the cover plate 192 that may be contoured slightly (curved outward and around the strut 186) to provide a suitable edge distance around the diagonally extending strut 186. This connection (e.g., the buttressed connection 188) may provide for ease in weldability of the joint between the strut 186, the front plate 150 of the suspension connecting weldment 120 and the top plate 142 of the outlooking member 136. That is, this connection may avoid overlapping circular welds and may provide linear welds. As shown in FIGS. 2, 3, and 9, a similar buttress connection may be provided at a top side of the strut 186 where the strut frames into the bottom side of the tieback 130 bar and the rear side of the hangar bar 160.

The hangar bar 160 may extend generally vertically and slightly outward from the outlooking member 136 of the base frame 126 to a free end of the tieback bar 130. Like the strut 186, the hangar bar 160 may be a generally round tube, or a rectangular tube or cross-sectional shape may be provided. The hangar bar 160 may function to provide support to the outlooking members 136 of the base frame by securing them to the free end of the tieback bar 130 that is propped up by the diagonally extending strut 186. In one or more examples, the hangar bar 160 may be welded to the top plate 142 of the outlooking member 136 and to a bottom plate of the tieback bar 130.

The tieback bars 130 may be configured for resisting the forward thrust of the diagonally extending strut 186 induced by the downward force of the hangar 160 bar acting on a top end thereof. That is, a tieback bar 130 may be provided on either side of the front rail weldment 122 and may function to provide tensile force to the top end of the upright supports 128. Each tieback bar 130 may be a generally rectangular tube or a round cross section or other cross section may be provided. The tieback bar 130 may extend generally longitudinally along the frame 102 and back to one or more support points near the junction of the central and front portions 116/118 of the support frame 102.

The front rail weldment 122 may include one or more laterally extending support systems 132. That is, as shown in FIG. 9, a laterally extending support system may include a laterally extending perch 194 extending from the free end of the front right tieback bar 130. The perch 194 may include a generally round bar or a rectangular or other cross-sectional shape may be provided. The laterally extending support system 132 may include one or more mounting brackets 198 for securing features of the front portion of the work machine 100. In one or more examples, the perch 194 may be supported off of the hangar bar 160 with a bracket 196 such as a radiused bracket.

Referring back to FIG. 2, on the left front side of the front rail weldment 122, a lateral extending support system 132 may include a laterally extending bar 200 supported by a strut 202. The laterally extending bar 200 may include a rectangular bar or a round or an otherwise shaped bar may be provided. The bar 200 may extend from the free end of the left tieback bar 130 laterally outward to its own free end. A strut 202 may extend upward from the outlooking member 136 on the left side of the base frame 126 to support the bar 200. As shown in FIG. 8, the strut 202 may extend from the outlooking member 136 at a laterally extending bracket 204. That is, the strut 202 may engage the outlooking member 136 at a location similar to the hangar bar 160 on that side of the weldment 122. At a side of the outlooking member 136 where the hangar bar 160 is attached, a laterally extending bracket 204 may be provided. The bracket 204 may include one or more gusset plates 206 arranged between a laterally extending portion of the bottom plate 140 of the outlooking member 136 and a laterally extending portion of the top plate 142 of the outlooking member 136. The laterally extending portion of bottom plate 140 of outlooking member 136 may extend generally straight laterally from the bottom of the outlooking member 136. In contrast, the laterally extending portion of the top plate 142 may be bent or curved slightly downward across the tops of the gusset plates 206 providing a more square or orthogonal interface with the bottom of the strut 202. That is, the strut 202 may frame into a top surface of the laterally extending portion of the top plate 142 at an angle closer to orthogonal than if the top plate extended straight laterally. In some cases, the angle may be an orthogonal angle. Referring back to FIG. 2, a longitudinally extending support element 208 may extend from the free end of the laterally extending bar 200 rearward to a fixture 210 connecting several diagonally extending struts and/or bars 212.

INDUSTRIAL APPLICABILITY

The present front rail weldment design is advantageous in reducing the number of members including 7 fewer tubes than previous designs and many fewer gussets. The cross member 137 also has a smooth top and an open bottom design that avoids the collection of debris and other matter. The profile of the top plate 142 of the outlooking members 136 (particularly at the connection to the suspension connecting weldment 120) assists with keeping high stresses away from the weld joint and in the parent material. This also applies, for example, at the bottom plate 140 of the outlooking members 136 where it transitions to the cross member 137 and where the top plate 142 transitions to the cross member 137.

The above detailed description is intended to be illustrative, and not restrictive. The scope of the disclosure should, therefore, be determined with references to the appended claims, along with the full scope of equivalents to which such claims are entitled.

What is claimed is:

1. A front rail weldment, comprising:
   a base frame comprising a pair of outlooking members that are substantially uninterrupted, each extending from a first end to a second end and having a top plate with an inboard edge that is flared inward at the first end and an outboard edge that is flared outward at the first end, the base frame further comprising a cross member extending between the pair of outlooking members;
   a pair of hanger bars each secured to a respective outlooking member of the pair of outlooking members at or near a midpoint of the respective outlooking member and extending upward to a top end;
   a pair of struts extending from a respective first end of the respective outlooking member to the top end of a respective hanger bar of the pair of hanger bars; and
   a pair of tieback bars each configured for tying back the top end of the respective hanger bar of the pair of hanger bars.

2. The front rail weldment of claim 1, wherein a front rail is secured to each of the second ends of the pair of outlooking members.

3. The front rail weldment of claim 1, wherein a buttressed connection is provided at the respective first end of the pair of outlooking members.

4. The front rail weldment of claim 3, wherein the buttressed connection comprises one or more triangular plates and a cover plate, wherein a respective strut of the pair of struts frames into the cover plate.

5. The front rail weldment of claim 1, wherein the pair of outlooking members comprises a pair of side plates and a bottom plate.

6. The front rail weldment of claim 1, wherein the cross member comprises a pair of outboard portions and a central portion arranged between the pair of outboard portions.

7. The front rail weldment of claim 6, wherein the central portion comprises a pair of side plates, a mount plate, and flank plates extending downward therefrom alongside the pair of side plates.

8. The front rail weldment of claim 1, further comprising a laterally extending support system.

9. The front rail weldment of claim 8, wherein the laterally extending support system comprises a laterally extending bar extending from a free end of one of the pair of tieback bars.

10. The front rail weldment of claim 9, further comprising a strut supporting the laterally extending bar and secured at a bottom end thereof to the respective outlooking member at a laterally extending bracket.

11. The front rail weldment of claim 10, wherein the laterally extending bracket comprises one or more gussets secured to a side plate of the respective outlooking member and extending between a laterally extending portion of a bottom plate of the respective outlooking member and a laterally extending portion of a top plate of the respective outlooking member.

12. A work machine comprising:
   a frame;
   a prime mover arranged on the frame; and
   a wheel and tire assembly operably coupled to the prime mover and coupled to the frame with a suspension, wherein the frame comprises a front rail weldment according to claim 1.

13. A front rail weldment, comprising:
   a base frame comprising a pair outlooking members that are substantially uninterrupted, each extending from a first end to a second end, the base frame further comprising a cross member extending between the pair of outlooking members;
   a pair of hanger bars each secured to a respective outlooking member of the pair of outlooking members at or near a midpoint of the respective outlooking member and extending upward to a top end;

a pair of struts extending from a respective first end of the respective outlooking member to the top end of a respective hanger bar of the pair of hanger bars;

a pair of tieback bars each configured for tying back the top end of the respective hanger bar of the pair of hanger bars; and a laterally extending support system comprising a laterally extending bar extending from a free end of one of the pair of tieback bars and a strut supporting the laterally extending bar and secured at a bottom end thereof to the respective outlooking member at a laterally extending bracket, the laterally extending bracket comprising a laterally extending portion of a top plate of the respective outlooking member supported by one or more gussets, wherein the laterally extending portion of the top plate is curved downward and the strut is secured to a top surface thereof.

14. The front rail weldment of claim 13, wherein the pair of outlooking members comprises a pair of side plates and a bottom plate, wherein the top plate comprises inboard and outboard edges each being flared inward and outward, respectively, at their respective first ends.

15. The front rail weldment of claim 13, wherein a buttressed connection is provided at the first end of the respective outlooking member of the pair of outlooking members, wherein:
the buttressed connection comprises one or more triangular plates and a cover plate; and
a respective strut of the pair of struts frames into the cover plate.

16. The front rail weldment of claim 13, wherein the front rail weldment further comprises a laterally extending support system.

17. The front rail weldment of claim 16, wherein the laterally extending support system comprises a laterally extending bar extending from a free end of one of the pair of tieback bars and a strut supporting the laterally extending bar and secured at a bottom end thereof to a respective outlooking member at a laterally extending bracket.

18. The front rail weldment of claim 17, wherein the laterally extending bracket comprises one or more gussets secured to a side plate of the respective outlooking member and extending between a laterally extending portion of a bottom plate of the respective outlooking member and a laterally extending portion of a top plate of the respective outlooking member.

19. A front rail weldment, comprising:
a base frame comprising a pair of outlooking members that are substantially uninterrupted, each extending from a first end to a second end, the base frame further comprising a cross member extending between the pair of outlooking members;

a pair of hanger bars each secured to a respective outlooking members of the pair of outlooking members at or near a midpoint of the respective outlooking member and extending upward to a top end;

a pair of struts extending from a respective first end of the respective outlooking member to the top end of a respective hanger bar of the pair of hanger bars; and a pair of tieback bars each configured for tying back the top end of the respective hanger bar of the pair of hanger bars, wherein, a buttressed connection, comprising one or more triangular plates and a cover plate, is secured to the respective outlooking member at the first end thereof and a respective strut of the pair of struts frames into the cover plate of the buttressed connection.

\* \* \* \* \*